March 27, 1956  E. C. HOOVER  2,739,748
AUTOMOBILE FISHING POLE HOLDER
Filed Sept. 8, 1954

ELWOOD C. HOOVER
INVENTOR

BY
McMorrow, Berman + Davidson
ATTORNEY

United States Patent Office 2,739,748
Patented Mar. 27, 1956

2,739,748
AUTOMOBILE FISHING POLE HOLDER

Elwood C. Hoover, Linden, Pa.

Application September 8, 1954, Serial No. 454,800

2 Claims. (Cl. 224—42.45)

The present invention relates to a fishing pole holder for attachment to the roof of an automobile along and to the rain gutter on the edge of the roof over the doors and windows.

Briefly described, the present invention is clamped to the rain gutter of the automobile and has sockets to hold the handle or ends of a fishing pole. It is used in pairs, one near each end of the roof over the windows and doors.

The use of the present invention will do away with taking apart the fishing rod or storing it within the compartment of the automobile. Frequently fishing rods have been held by one end within the automobile and have projected out an open window at the other end. This is a dangerous practice and not only has caused a great deal of damage to the fishing rods and to the automobile but has resulted in serious injuries.

Car top carriers for automobiles are usually too bulky and too hard to install for the simple purpose of carrying a fishing pole to the fishing location.

The principal object of the present invention, therefore, is to provide a simple and inexpensively constructed device to attach to the rain gutter at the forward end and at the rear end of an automobile over the doors and windows.

Another object of the present invention is to provide a clamp for a fishing rod which will carry one or two or more fishing rods and will carry them pointing in the direction of travel of the automobile in order that the fishing rods not be bent or project laterally from the side of the automobile.

These and other objects and advantages of the present invention will be fully apparent from the following description when taken in consideration with the annexed drawings, in which.

Figure 1:
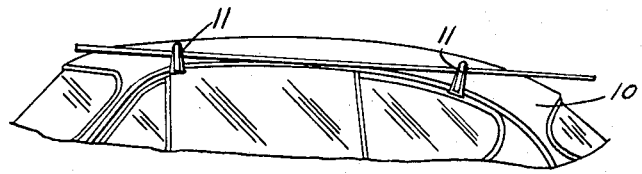
Figure 1 is the view of the top of an automobile with the present invention installed thereon.
Figures 2, 3, 4:
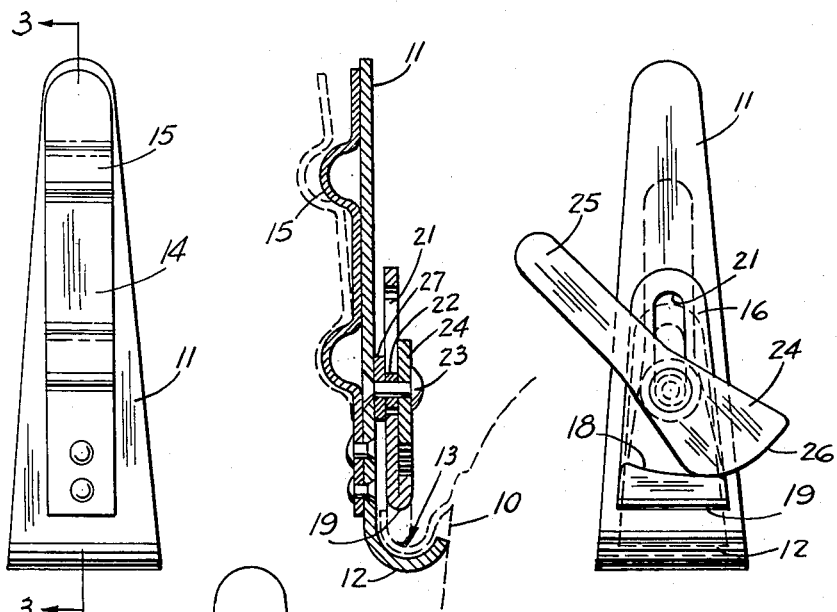
Figure 2 is a plan view in elevation of the present invention.
Figure 3 is a side view in cross section on line 3—3 of Figure 2.
Figure 4 is a view in elevation on the other side from Figure 2.
Figure 5:
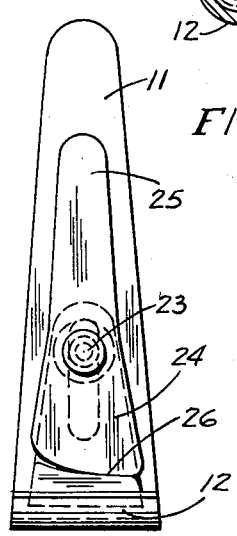
Figure 5 is a similar view to Figure 4 but showing it in clamped position.

Referring in greater detail to the drawings in which like numerals indicate like parts throughout the several views, an automobile top 10 is shown in Figure 1 with the present invention installed thereon. The invention comprises an upstanding elongated support plate 11 having its lower end formed into a hook portion 12 which extends upwardly around the convex lower surface of the rain gutter, as shown in dotted lines at 13 in Figure 3.

Secured by its lower end to one side of the support plate 11 is a resilient tongue 14 which extends upwardly along and normally in contact with the support plate 11. The tongue is provided with a plurality of sockets 15 which are formed by the outwardly bent portions of the tongue as seen most clearly in Figure 3.

On the other side of the support plate 11 opposite to the tongue is positioned a clamping plate 16 formed at its lower end with an upwardly bent cam portion 17 which has an upwardly directed cam face 18 and a curved under face 19.

The clamping plate 16 is formed with a slot 21 through its upper end and in which slides the washer 22 on the rivet 23 which connects the clamping plate 16 to the support plate 11.

A cam lever 24 is positioned in face to face relation with respect to the clamping plate 16 and is connected to the support plate 11 for swinging movement about an axis transverse of the support plate or the rivet 23 and is formed at its upper end with a handle 25 and at its lower end with a cooperating cam face 26.

A spacer washer 27 on the rivet 23 maintains the clamping plate 16 in spaced face to face relation with respect to the support plate 11. The clamping plate 16 is slidable in longitudinal movement on the support plate 11 due to the slot 21.

In operation the support plate 11 is placed with its upwardly extending hook portion 12 underneath and in contact with the under surface of the rain gutter 13 and the clamping plate is moved into contact with its curved underface in the rain gutter. The cam lever is then turned to tighten the clamping plate 16 in contact with the rain gutter on one side and with the support plate on the other side.

While only a single preferred embodiment has been here shown and described, other embodiments of the present invention may be made and practised and many changes and modifications may be made within the scope of the appended claims without departing from the spirit of the invention.

What is claimed is:

1. A fishing pole holder for detachably mounting on an automobile comprising an upstanding elongated support plate having its lower end terminating in an upwardly extending hook portion for engaging the convex under surface of an upwardly facing rain gutter on the edge of an automobile roof, a clamping plate disposed in spaced face to face relation with respect to said support plate, means securing said clamping plate on said support plate for sliding longitudinal movement thereon, said clamping plate being formed at its lower end with a cam portion having an upwardly directed cam face and a convex under face, said convex under face being engageable with the concave upper surface of said rain gutter, a cam lever positioned in face to face relation with respect to said clamping plate and connected to said support plate for swinging movement about an axis transverse of said support plate and having one end engageable with said cam face and operable to move said cam under face into clamping engagement with the convex upper surface of said rain gutter, and means on said support plate including sockets adapted to receive fishing poles therein and to be aligned with corresponding sockets of a similar holder spaced therefrom along said gutter so as jointly to support a fishing pole in each pair of aligned sockets.

2. A fishing pole holder for detachably mounting on an automobile comprising an upstanding elongated support plate having its lower end terminating in an upwardly extending hook portion for engaging the convex under surface of an upwardly facing rain gutter on the edge of an automobile roof, a clamping plate disposed in face to face relation with respect to said support plate, means securing said clamping plate on said support plate for sliding longitudinal movement thereon, said clamping plate being formed at its lower end with a cam portion having an upwardly directed cam face and a convex under face, said convex under face being engageable with the concave upper surface of said rain gutter, a cam lever positioned in face to face relation with respect to said clamping plate and connected to said support plate for swinging movement about an axis transverse of said support plate and having one end engageable with said cam face and operable to move said cam under face into clamping engagement with the convex upper surface of said rain gutter, and an upstanding resilient tongue secured by one end to said support plate adjacent said hook portion and positioned along and normally in contact with said support plate, said tongue being formed with spaced sockets adapted to receive fishing poles therein and to be aligned with corresponding sockets of a similar holder spaced therefrom along said gutter so as jointly to support a fishing pole in each pair of aligned sockets.

References Cited in the file of this patent

UNITED STATES PATENTS

| | | |
|---|---|---|
| 2,514,266 | Walslager | July 4, 1950 |
| 2,554,650 | Waite | May 29, 1951 |
| 2,603,394 | Beck | July 15, 1952 |
| 2,625,995 | Rust et al. | Jan. 20, 1953 |
| 2,671,583 | Shaw | Mar. 9, 1954 |